United States Patent
Roddy

(10) Patent No.: US 6,457,524 B1
(45) Date of Patent: Oct. 1, 2002

(54) WELL CEMENTING COMPOSITIONS AND METHODS

(75) Inventor: Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/663,642

(22) Filed: Sep. 15, 2000

(51) Int. Cl.$^7$ .................. E21B 33/13; E21B 33/138
(52) U.S. Cl. .................. 166/293; 166/292; 166/309; 106/672; 106/678; 106/713; 106/725; 507/202; 507/269; 507/271
(58) Field of Search .................. 166/292, 293, 166/309; 106/672, 678, 713, 725; 507/202, 269, 271

(56) References Cited

U.S. PATENT DOCUMENTS

| | | | |
|---|---|---|---|
| 2,929,729 A | 3/1960 | Waggoner | |
| 3,483,007 A | 12/1969 | Hook | |
| 3,663,287 A | 5/1972 | Mizunuma et al. | |
| 3,887,009 A | 6/1975 | Miller et al. | 166/292 |
| 3,959,003 A | 5/1976 | Ostroot et al. | |
| 4,045,236 A | 8/1977 | Bianchi | |
| 4,132,558 A | 1/1979 | Uchikawa et al. | |
| 4,160,674 A | 7/1979 | Sawyer | |
| 4,234,434 A | 11/1980 | Tinsley et al. | |
| 4,256,500 A | 3/1981 | Turpin, Jr. | |
| 4,304,298 A | 12/1981 | Sutton | 106/293 |
| 4,340,427 A | 7/1982 | Sutton | |
| 4,444,593 A | 4/1984 | Schutz | |
| 4,557,763 A | 12/1985 | George et al. | |
| 4,761,183 A | 8/1988 | Clarke | |
| 5,086,850 A | 2/1992 | Harris et al. | 175/61 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,133,409 A | 7/1992 | Bour et al. | 166/293 |
| 5,147,565 A | 9/1992 | Bour et al. | |
| 5,238,064 A | 8/1993 | Dahl et al. | 166/293 |
| 5,339,902 A | 8/1994 | Harris et al. | 166/293 |
| 5,339,903 A | 8/1994 | Eoff et al. | 166/293 |
| 5,358,047 A | 10/1994 | Himes et al. | 166/280 |
| 5,383,521 A | 1/1995 | Onan et al. | 166/293 |
| 5,387,740 A | 2/1995 | Sasae et al. | 588/257 |
| 5,397,516 A | 3/1995 | Sikaffy | 264/42 |
| 5,484,019 A | 1/1996 | Griffith | 166/293 |
| 5,512,096 A | 4/1996 | Krause | 106/718 |
| 5,547,024 A | 8/1996 | Di Lullo Arias | 166/292 |
| 5,571,318 A | 11/1996 | Griffith et al. | 106/725 |
| 5,588,489 A | 12/1996 | Chatterji et al. | 166/293 |
| 5,696,059 A | 12/1997 | Onan et al. | 507/269 |
| 5,711,801 A | 1/1998 | Chatterko et al. | 106/789 |
| 5,749,418 A | 5/1998 | Mehta et al. | 166/292 |
| 5,806,594 A | 9/1998 | Stiles et al. | 166/293 |
| 5,814,253 A | 9/1998 | Sikaffy et al. | 264/42 |
| 5,820,670 A | 10/1998 | Chatterji et al. | 106/727 |
| 5,897,699 A | 4/1999 | Chatterji et al. | 106/678 |
| 5,900,053 A | 5/1999 | Brothers et al. | 106/678 |
| 5,968,255 A | 10/1999 | Mehta et al. | 106/724 |
| 5,972,103 A | 10/1999 | Mehta et al. | 106/728 |
| 6,060,535 A * | 5/2000 | Villar et al. | 166/293 |
| 6,063,738 A | 5/2000 | Chatterji et al. | 507/269 |
| 6,145,591 A * | 11/2000 | Boncan et al. | 166/292 X |
| 6,170,575 B1 * | 1/2001 | Reddy et al. | 166/293 |
| 6,244,343 B1 * | 6/2001 | Brothers et al. | 166/293 |
| 6,273,191 B1 * | 8/2001 | Reddy et al. | 166/293 |
| 6,366,505 B1 | 1/2002 | Reddy | 166/293 |

FOREIGN PATENT DOCUMENTS

| | | |
|---|---|---|
| GB | 2080812 | 2/1982 |
| GB | 2128179 | 4/1984 |
| GB | 2156801 | 10/1985 |
| JP | 53-12929 | 7/1976 |
| SU | 814927 | 3/1979 |
| SU | 785463 | 12/1980 |
| WO | WO 98/46542 | 10/1998 |
| WO | WO 99/37594 | 7/1999 |
| WO | WO 00/41981 | 7/2000 |

OTHER PUBLICATIONS

U.S. patent application Publication No. US 2002/0005287 A1 published Jan. 17, 2002 to B. Raghava Reddy et al.
Derwent Publications, Ltd., GB; Abstract No. XP–002072596, abstract of an article by Bushledt entitled "Use of Iron Chloride . . . concretes" (1963).
Derwent Publications, Ltd., Abstract No. XP–002072597, abstract of Soviet Union Patent Specification No. 785463, Dec. 7, 1980.
Derwent Publications, Ltd. Abstract No. XP–002072598, abstract of Soviet Union Patent Specification No. 1776761, Nov. 23, 1992.
Derwent Publications, Ltd. Abstract No. XP–002072599, abstract of Soviet Union Patent Specification No. 1432194, Oct. 23, 1988.
Derwent Publications, Ltd. Abstract No. XP–002072600, abstract of Russian Patent Specification No. 1091616, Sep. 20, 1995.
WPIDS Abstract No. 96–199218 (Sep. 1995).
WPIDS Abstract No. 93–402468 (Nov. 1992).
Chemical Abstract No. 70:60504 (1968).
Chemical Abstract No. 75:9537 (1970).

(List continued on next page.)

Primary Examiner—George Suchfield
(74) Attorney, Agent, or Firm—Craig W. Roddy; Robert A. Kent

(57) ABSTRACT

The present invention provides improved lightweight well cement compositions useful for performing a variety of cementing applications in subterranean formations and particularly for cementing conductor pipe in offshore wells. A preferred cement composition basically comprises a hydraulic cement, an effective amount of an iron salt selected from the group of ferric chloride, ferrous chloride or mixtures thereof to reduce the transition time of the composition, sufficient water to form a pumpable slurry, an effective amount of a foaming additive for producing a foamed slurry, and sufficient gas to foam the slurry.

37 Claims, No Drawings

OTHER PUBLICATIONS

Chemical Abstract No. 78:33390 (1972).
Chemical Abstract No. 84:78711 (1975).
Chemical Abstract No. 90:173527 (1977).
Chemical Abstract No. 93:12385 (1980).
Chemical Abstract No. 108:61453 (Oct. 1987).
Chemical Abstract No. 116:179840.
"Cementing" by Dwight K. Smith, Second Printing 1980, Chapter 3, pp. 18–27.
SPE Paper No. 9285, "Transition Time of Cement Slurries Between The Fluid And Set State" by Fred L. Sabins et al., Sep. 21–24, 1980.
SPE Paper No. 11207, "Gas Flow In Cements" by P.R. Cheung et al., Sep. 26–29, 1982.
Oil & Gas Journal article, Preventing Annular Gas Flow—Two Parts, "Annular gas flow theory and prevention methods described" by David L. Sutton et al., Dec. 10 & 17, 1984.
SPE Paper No. 18984, "Application of Foam Cement in the Williston Basin" by D.L. Bour et al., Mar. 6–8, 1989, pp. 555–562.
SPE Paper No. 24050, "New Technique Provides Better Low–Density–Cement Evaluation" by P.E. Harness et al., Mar. 30–Apr. 1, 1992, pp. 249–258.
Oil & Gas Journal article, Practical Drilling Technology, "Foamed cement job successful in deep HTHP offshore well" by O. Glen Benge et al., Mar. 11, 1996, pp. 58–63.
OTC Paper No. 8304, "Cementing the Conductor Casing Annulus in an Overpressured Water" by James Griffith et al., dated May 5–8, 1997.
The Brief, Technical Articles, "Foam Cement Technology Successfully Solves Problems in Trinidad Offshore Operations" by Daniel L. Bour et al, Sep. 1997, pp. 1–5.

Oil & Gas Journal article, "Mud Management, special slurries improve deepwater cementing operations" by James Griffith et al., Oct. 20, 1997, pp. 49–51.

SPE Paper No. 57585, "Custom–Blending Foamed Cement for Multiple Challenges" by Kazufusa Kimura et al., Nov. 8–10, 1999.

IADC/SPE Paper No. 59136, "Foaming Cement as a Deterrent to Compaction Damage in Deepwater Production" by J. White et al., Feb. 23–25, 2000.

OTC Paper No. 11977, "Next–Generation Cementing Systems to Control Shallow Water Flow" by Ronnie Faul et al., May 1–4, 2000.

Halliburton Energy Services press release, "Halliburton Energy Services Introduces New Deepwater System for Shallow Water Flow Control", Jul. 13, 2000.

Halliburton brochure entitled "Deep Water Flo–Stop Controlling Shallow Waterflows—No Problem", Sep. 1998.

Halliburton brochure entitled "Spherelite Cement Additive," 1999.

Halliburton brochure entitled "Econolite Additive for Cement Slurries," 1998.

Halliburton brochure entitled "Calcium Chloride ($CaCl_2$) Additive," 1999.

Halliburton brochure entitled "Sodium Chloride (NaCl) Accelerator," 1998.

Halliburton brochure entitled "Zoneseal Isolation Process," 1998.

* cited by examiner

WELL CEMENTING COMPOSITIONS AND METHODS

BACKGROUND OF THE INVENTION

1. Field of the Invention

The present invention relates to improved lightweight well cementing compositions having reduced transition times and methods of using the compositions for cementing in subterranean zones penetrated by well bores.

2. Description of the Prior Art

Hydraulic cement compositions are commonly utilized in the construction and repair of oil and gas wells. For example, hydraulic cement compositions are used in primary cementing operations whereby strings of pipe such as casing or liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented. Hydraulic cement compositions are also commonly used to plug lost circulation and other undesirable fluid inflow and outflow zones in wells, to plug cracks and holes in pipe strings cemented therein and to accomplish other required remedial well operations.

In carrying out primary cementing as well as remedial cementing operations in well bores, the cement slurries utilized are often lightweight to help prevent excessive hydrostatic pressure from being exerted on subterranean formations penetrated by the well bore. As a result, a variety of lightweight cement slurries have heretofore been developed and used including foamed cement slurries. In addition to being lightweight, a foamed cement slurry contains compressed gas that improves the ability of the slurry to maintain pressure and prevent the flow of formation fluids into and through the slurry during the time in which the cement slurry changes from a fluid to a hard set mass. Foamed cement slurries are also advantageous because they have low fluid loss properties.

Well completions in water over 1000 feet deep often require special techniques to install conductor casing. Well completions at depths in excess of 2,000 feet of water are often referred to as "deepwater" operations. In deepwater operations, the formations where conductor pipe is cemented that is less than 2,000 feet below mud line (BML) are generally young geologically and are not well consolidated. The formations generally are the product of erosion from the continental shelf. This can cause either of two problems in cementing. The formation may be so weak that it may fracture during cementing and cause the loss of cement into the formation. Alternatively, the formation may experience high saltwater or other fluid flow through the formation resulting in fluid influx.

In a typical conductor pipe installation, a 24–30 OD inch surface pipe is driven at least 200 feet BML. A large diameter (20 in. OD when 30 in. OD used) conductor pipe then is cemented by the conventional innerstring method through the drill pipe, with cement returns back to the ocean floor. Since no riser is used, the annular returns must be taken at the sea floor. Cool temperatures caused by the seawater typically slow the cement hydration process and extend the transition time of the cement slurry that allows fluid influx to begin.

The term "zero gel time" refers to the period of time between when the cement slurry is placed and the gel strength increases to a level of about 100 lbf/100 ft$^2$. During the zero gel time, a fluid such as oil, gas or water is prevented from migrating through the setting cement because the cement column in the well bore can support itself and exert hydrostatic pressure on the fluid surrounding the well bore.

The term "transition time" refers to the period of time it takes the gel strength to increase from a level of about 100 lbf/100 ft$^2$ to a level of about 500 lbf/100 ft$^2$. Fluid migration is substantially prevented at the level of about 500 lbf/100 ft$^2$. During the transition time, a fluid such as oil, gas or water can migrate through the setting cement slurry forming channels that effect the integrity of the cement sheath. The fluid migration is possible during the transition time because the cement column in the well bore begins to support itself and stops exerting hydrostatic pressure on the fluid surrounding the well bore. When the exerted hydrostatic pressure falls below the formation fluid pressure, migration can occur and will continue until the cement develops sufficient compressive strength to prevent further migration. Therefore, it is beneficial to have cement compositions with reduced transition times to help minimize the chances of fluid migration.

In some instances, the formation sands may be over-pressured by water so that water or other formation fluids flows into the setting cement sheath during the transition time. Prevention of such flow is critical to a successful cementing job and to avoid expensive remedial squeeze cementing treatments. Containment of the over-pressured formation fluid often is complicated by weak zones in the formation that can fracture due to the fluid pressure of the cement slurry. If a fracture is formed, the cement slurry can flow into the fracture and be lost from the well bore.

One method for cementing conductor pipes in well bores in water depths greater than 1000 feet is described in U.S. Pat. No. 5,484,019, wherein a cement slurry comprising Portland cement, a foaming surfactant, a quantity of fine particle size cementitious material and nitrogen or other gas to foam the slurry to yield a density of from about 9.0 to about 14 lbs/gal is introduced down the conductor pipe and permitted to return up the annulus of the well bore to the seafloor. The slurry contains calcium chloride (CaCl$_2$) as an accelerator and develops a static gel strength in excess of about 500 lbf/100 ft$^2$ within less than about 30 minutes after placement.

Although the above-described compositions are effective in cementing wells, there is a continuing need for improved lightweight cement compositions that have reduced transitions times to help protect against fluid migration.

SUMMARY OF THE INVENTION

The present invention provides improved lightweight well cement compositions and methods of using the cement compositions that meet the needs described above and provide improvements over the prior art. A preferred lightweight cement composition is basically comprised of a hydraulic cement, an effective amount of an iron salt selected from the group of ferric chloride, ferrous chloride or mixtures thereof to reduce the transition time of the composition, sufficient water to form a pumpable slurry, an effective amount of a foaming additive for producing a foamed slurry, and sufficient gas to foam the slurry.

A preferred method of the present invention for cementing in a subterranean zone penetrated by a well using a lightweight cement is accomplished by preparing a pumpable lightweight cement slurry having a density of less than about 14 lbs/gal and an effective amount of an iron compound to reduce the transition time thereof, placing the slurry in the subterranean zone to be cemented, and allowing the slurry to set into a hard impermeable mass. The methods are particularly suited for cementing conductor pipe in a well bore wherein the pipe is situated in the well bore penetrating a subterranean formation so as to define an annular space between the pipe and the wall of the well bore and the well bore is drilled from a seafloor at a water depth of at least 1000 feet. Preferred cement compositions of the present invention are formulated to provide a transition time of less than about 25 minutes, more preferably, less than about 20 minutes and, most preferably, less than about 15 minutes.

It is, therefore, a general object of the present invention to provide improved lightweight cement compositions having reduced transition times for use in oil and gas well cementing applications.

Other and further objects, features and advantages of the present invention will be readily apparent to those skilled in the art upon reading of the description of preferred embodiments which follows.

DESCRIPTION OF THE PREFERRED EMBODIMENTS

The improved lightweight cement compositions of this invention are useful for performing a variety of applications in subterranean formations such as completion, remedial and fracturing procedures. The lightweight cement compositions basically comprise a hydraulic cement, an effective amount of an iron salt to reduce the transition time of the composition, sufficient water to form a pumpable slurry, an effective amount of a foaming additive for producing a foamed slurry, and sufficient gas to foam the slurry. Alternatively, instead of being foamed or in addition to being foamed the lightweight cement composition may incorporate any known lightweight cement additive, e.g., hollow spheres available under the tradename "SPHER-ELITE" by Halliburton Energy Services, Duncan, Okla., that reduces the density thereof to produce a lightweight cement composition. Preferred lightweight compositions of the present invention have a density of less than about 14 lbs/gal.

A variety of hydraulic cements which set and harden by reaction with water can be utilized in accordance with the present invention including Portland cements, pozzolana cements, gypsum cements, high aluminum content cements, silica cements, high alkalinity cements and slag cements. The cements can be of conventional particle sizes or they can be of fine particle sizes. Portland cements are most preferred for use in accordance with this invention. Portland cements of the types defined and described in *API Specification for Materials and Testing for Well Cement, API Specification 10, 5th Edition*, dated Jul. 1, 1990 of the American Petroleum Institute are particularly suitable. Preferred such API Portland cements include Classes A, B, C, G and H, with API Class A being the most preferred.

The cement compositions of the present invention may include fine or ultra-fine particle size cement, e.g., cement available under the tradename "MICRO MATRIX®" by Halliburton Energy Services, Duncan, Okla. More particularly, to a conventional hydraulic cement there may be added from about 1 to about 30 percent (30%) by weight of conventional cement of a cementitious material having particle diameters no larger than about 30 microns, preferably no larger than about 17 microns, and still more preferably no larger than about 11 microns. The distribution of various sized particles within the cementitious material, i.e., the particle size distribution, features 90 percent (90%) of them having a diameter not greater than about 25 microns, preferably about 10 microns and still more preferably about 7 microns. Fifty percent (50%) having a diameter not greater than about 10 microns, preferably about 6 microns and still more preferably about 4 microns and 20 percent (20%) of the particles having a diameter not greater than about 5 microns preferably about 3 microns and still more preferably about 2 microns.

The Blaine Fineness of the fine particle size cementitious material used in the cementing methods of this invention is no less than about 6000 $cm^2$/gram. The value is preferably greater than about 7000, more preferably about 10,000, and still more preferably greater than about 13,000 $cm^2$/gram.

The fine particle size cementitious materials preferred for use in this invention are ultrafine Portland cement and combinations thereof with slag wherein the quantity of Portland cement included in any mixture of Portland cement and slag used in the methods of this invention can be as low as 10 percent (10%) but is preferably no less than about 40 percent (40%), more preferably about 80 percent (80%) and most preferably no less than about 100 percent (100%) Portland cement by weight of mixture. The fine particle size cementitious material is more fully described in U.S. Pat. No. 5,125,455, the entire disclosure of which is incorporated by reference herein.

Compositions of the present invention may include flow enhancing additives wherein the flow properties of one or more dry particulate cementitious materials is improved and wherein the materials can be readily conveyed out of storage tanks and the like. The preferred flow enhancing additive is comprised of a particulate solid material selected from the group consisting of precipitated silica, zeolite, talcum, diatomaceous earth and fuller's earth carrying a flow inducing polar chemical thereon which is selected from the group consisting of polar molecule producing organic acids, their salts and acid anhydrides.

The flow inducing polar chemical utilized in the flow enhancing additive can be any of the heretofore known chemicals that produce polar molecules that react with cementitious materials and increase their flow properties. Examples of polar molecule producing chemicals that can be utilized include, but are not limited to, organic acids such as alkyl and/or alkene carboxylic acids and sulfonic acids, salts of the foregoing acids formed with weak bases and acid anhydrides such as sulfur dioxide, carbon dioxide, sulfur trioxide, nitrogen oxides and similar compounds. The most preferred flow inducing polar chemical for use in accordance with this invention is glacial acetic acid.

The weight ratio of solid adsorbent material to flow inducing polar chemical in the flow enhancing additive is in the range of from about 90:10 to about 10:90, and the flow enhancing additive is blended with the cementitious materials in an amount in the range of from about 0.01% to about 1.0% by weight of the cementitious materials. A particularly preferred flow enhancing additive is described in PCT Publication No. WO 00/41981, which claims priority from U.S. patent application Ser. Nos. 09/229,245 filed Jan. 12, 1999 and 09/324,310 filed Jun. 2, 1999. The entire disclosures of U.S. patent application Ser. Nos. 09/229,245 and 09/324,310 are incorporated by reference herein.

The water in the cement slurries can be fresh water or saltwater. The term "saltwater" is used herein to mean unsaturated salt solutions and saturated salt solutions including brines and seawater. The water is generally present in an amount sufficient to produce a pumpable slurry, more preferably, in an amount in the range of from about 30% to about 70% by weight of cement in the composition and, more preferably, as disclosed in preferred compositions of the present invention in an amount of about 63% by weight of cement therein.

The iron compounds used in the compositions of the present invention to reduce the transition times thereof are preferably iron salts selected from the group consisting of ferric chloride ($FeCl_3$), ferrous chloride ($FeCl_2$) and mixtures thereof, with the most preferred being ferric chloride. Although the above-mentioned iron salts are considered to be the most preferred, any iron compound that effectively reduces the transition time of the composition without adversely affecting the properties of the composition can be used. The iron salt is present in the composition in an amount in the range of from about 0.1 to about 10%, more preferably, an amount in the range of from about 0.5% to about 5% and, most preferably, an amount in the range of from of about 1% to about 3% by weight of the cement therein.

The term "foaming additive" is used herein to mean any known surfactant or surfactant and stabilizer mixture that will function to form a stable foam cement slurry. The most preferred foaming additives are single universal additives for foaming and stabilizing cement slurries containing fresh water or saltwater as described in U.S. Pat. No. 6,063,738, the entire disclosure of which is incorporated by reference herein. These foaming additives are basically comprised of an ethoxylated alcohol ether sulfate surfactant of the formula

$$H(CH_2)_a(OC_2H_4)_bOSO_3NH_4^+$$

wherein a is an integer in the range of from about 6 to about 10 and b is an integer in the range of from about 3 to about 10, an alkyl or alkene amidopropyl betaine surfactant having the formula

$$R—CONHCH_2CH_2CH_2N^+(CH_3)_2CH_2CO_2^-$$

wherein R is a radical selected from the group of decyl, cocoyl, lauryl, cetyl and oleyl and an alkyl or alkene amidopropyl dimethyl amine oxide surfactant having the formula

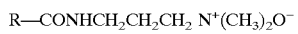

$$R—CONHCH_2CH_2CH_2 N^+(CH_3)_2O^-$$

wherein R is a radical selected from the group of decyl, cocoyl, lauryl, cetyl and oleyl. The ethoxylated alcohol ether sulfate surfactant is generally present in an additive of this invention in an amount in the range of from about 60 to about 64 parts by weight. The alkyl or alkene amidopropyl betaine surfactant is generally present in the additive in an amount in the range of from about 30 to about 33 parts by weight and the alkyl or alkene amidopropyl dimethyl amine oxide surfactant is generally present in the additive in an amount in the range of from about 3 to about 10 parts by weight. The additive can be in the form of a mixture of the above described surfactants, but more preferably, the additive includes fresh water in an amount sufficient to dissolve the surfactants whereby it can more easily be combined with a cement slurry.

A particularly preferred version of the above-described foaming additive is comprised of an ethoxylated alcohol ether sulfate surfactant wherein "a" in the formula thereof set forth above is an integer in the range of from 6 to 10 and the surfactant is present in the additive in an amount of about 63.3 parts by weight, the alkyl or alkene amidopropyl betaine surfactant is cocoyl-amidopropyl betaine and is present in the additive in an amount of about 31.7 parts by weight and the alkyl or alkene amidopropyl dimethyl amine oxide surfactant in the additive is cocoyl-amidopropyl dimethyl amine oxide and is present in an amount of about 5 parts by weight. This preferred foaming additive is generally included in a foamed cement slurry of this invention in an amount in the range of from about 1% to about 4% by volume of water in the cement slurry prior to being foamed.

In addition to water for dissolving the surfactants, this additive can include other components such as one or more freezing and pour point depressants to prevent it from freezing during storage or handling in cold weather and lower its pour point. Preferably, such depressants are selected from the group of ethylene glycol monobutyl ether, diethylene glycol, sodium chloride, isopropyl alcohol and mixtures thereof. The depressant or depressants utilized are generally present in the additive solution in an amount in the range of from about 10% to about 30% by weight of the solution.

Alternatively, any other known surfactant or surfactant and stabilizer mixture that will function to form a stable foam cement composition may be utilized. The cement slurry may also contain other conventional additives well known to those skilled in the art such as those to vary the composition density, increase or decrease strength, control fluid loss, reduce viscosity, increase resistance to corrosive fluids, enhance flow, and the like.

The gas utilized for forming the foamed cement slurries of this invention can be any suitable gas for producing a foamed slurry, such as air or nitrogen, with nitrogen being most preferred. The gas is present in an amount sufficient to produce a foamed slurry having a density of less than about 14 lbs/gal and, more preferably, in an amount sufficient to produce a foamed slurry having a density in the range of from about 4 to less than about 14 lbs/gal. The slurry is foamed by the addition of nitrogen or other gas to the mixture of cement, aqueous fluid and foaming additive. The density of the slurry may be controlled by the amount of nitrogen or gas admixed with the slurry. The specific density of the cement slurry will depend upon several factors; however, it is generally preferred to maintain the density at a level such that the fracturing gradient of the near surface formation in which the conductor pipe is being cemented is not exceeded. Generally, the density will be adjusted to provide a level slightly above the formation pressure but below the fracturing gradient to maintain control over the slurry and prevent fluid influx during the set of the cement slurry. Preferably, the density will be adjusted to a level of about 1 lb/gal above the density required to match the formation pressure in the well bore.

Methods of this invention for cementing a subterranean zone penetrated by a well bore basically comprise the steps of forming a lightweight cement slurry as described herein, pumping the cement slurry into the subterranean zone to be cemented by way of the well bore and then allowing the cement slurry to set into a hard impermeable mass therein. Another method of the present invention comprises the steps of preparing a pumpable lightweight cement slurry having a density of less than about 14 lbs/gal, reducing the transition time of the lightweight cement slurry by including an effective amount of an iron compound in the composition to reduce the transition time thereof, placing the slurry in the subterranean zone to be cemented, and allowing the slurry to set into a hard impermeable mass. Yet, another method of the present invention comprises the steps of preparing a foamed well cement composition comprising a hydraulic cement, sufficient water to form a pumpable slurry, an effective amount of a foaming additive for producing a foamed slurry, and sufficient gas to produce the foamed slurry; reducing the transition time of the foamed slurry by including an effective amount of an iron compound in the composition to reduce the transition time thereof; placing the slurry in the subterranean zone to be cemented; and allowing the slurry to set into a hard impermeable mass. Yet, another method of the present invention for reducing the transition time in a lightweight well cement composition placed in a subterranean formation comprises the steps of preparing a lightweight cement slurry; placing the slurry in the subterranean formation to be cemented; reducing the transition time of the slurry to less than about 15 minutes; and allowing the slurry to solidify in the subterranean formation.

A particularly preferred foamed well cement composition of the present invention useful for cementing a conductor pipe in a well bore in a seafloor in a water depth over 1000 feet comprises a hydraulic cement; ferric chloride, ferrous chloride or mixtures thereof present in an amount in the range of from about 0.1 to about 10 percent by weight of said composition; sufficient water selected from the group consisting of fresh water, unsaturated salt solutions and saturated salt solutions to form a pumpable slurry; an effective amount of a foaming additive for preparing a foamed slurry wherein the foaming additive is a single additive for foaming and stabilizing the slurry comprised of an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10 and the surfactant is present in the additive in an amount in the range of from about 60 to about 64 parts by weight, an alkyl or alkene amidopropyl betaine surfactant having the formula

$$R\text{—}CONHCH_2CH_2CH_2N^+(CH_3)_2CH_2CO_2^-$$

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula

$$R\text{—}CONHCH_2CH_2CH_2\ N^+(CH_3)_2O^-$$

wherein R is a radical selected from the group of decyl, cocoyl, lauryl, cetyl and oleyl and the surfactant is present in the additive in an amount in the range of from about 3 to about 10 parts by weight; sufficient gas to foam the slurry wherein the foamed slurry has a density of less than about 14 lbs/gal; and a particulate flow enhancing additive comprising a particulate solid material carrying a flow inducing chemical selected from the group consisting of polar molecule producing acids, their salts and acid anhydrides wherein said particulate solid material and said flow inducing chemical are present in the range of from about 90:10 to about 10:90.

A preferred method of this invention using the above-described foamed well cement composition for cementing a conductor pipe in a well bore in a seafloor in a water depth over 1000 feet comprises the steps of preparing the foamed well cement slurry, introducing the slurry into the conductor pipe whereby it is caused to flow through the pipe and return from the lower end thereof through an annulus present between the pipe and the well bore to the surface of the seafloor, and maintaining the slurry in the annulus for a sufficient time to enable the slurry to form a rigid cement sheath whereby influx of fluids into the well bore is prevented. The composition preferably has a transition time at seafloor temperatures of about 65° F. or less in said annulus in less than about 25 minutes, more preferably, in less than about 20 minutes and, most preferably, in less than about 15 minutes to substantially prevent fluid migration through the cement sheath in the well bore.

The lightweight well cement slurries of the present have reduced transition times over conventional lightweight and foamed cement slurries to help prevent the influx of formation fluids into the well bore. In order to further illustrate the improved cement compositions and methods of this invention, the following examples are given in Tables I and II below. Test slurries of the cement compositions of this invention comprise Portland Class A cement, fine particle size cement, seawater, foaming additives and various accelerating additives. Descriptions of the test samples are set forth in the Tables. The test samples were then measured for zero gel time, transition time and compressive strength.

TABLE I

| Slurry No. | Portland Cement | Micro Matrix® Cement (% bwoc) | Seawater (% bwoc) | Foaming Agent[2] (% bwow) | Foam Stabilizer[3] (% bwow) | Accelerating Additive (2% bwoc) | Zero Gel Time (hr:min) | Transition Time at 55° F. (hr:min) | Compressive Strength Foamed at 12 lbs/gal and at 50° F. (24 hr/72 hr) |
|---|---|---|---|---|---|---|---|---|---|
| 1 | Class A | 18 | 62.97 | 1.5 | 0.75 | CaCl$_2$ | 1:28 | 0:55 | 843/2065 |
| 2 | Class A | 18 | 62.97 | 1.5 | 0.75 | FeCl$_2$ | 1:29 | 0:21 | 755/2505 |
| 3 | Class A | 18 | 62.97 | 1.5 | 0.75 | FeCl$_3$ | 1:31 | 0:12 | 1028/2610 |

[1]Micro Matrix® cement from Halliburton Energy Services, Duncan, Oklahoma.
[2]CFA-S ™ foaming agent from Halliburton Energy Services, Duncan, Oklahoma.
[3]HC-2 ™ foam stabilizer from Halliburton Energy Services, Duncan, Oklahoma.

TABLE II

| Slurry No. | Portland Cement | Micro Matrix ® Cement[1] (% bwoc) | Seawater (% bwoc) | Foaming Additive[2] (% bwow) | Flow Additive[3] (% bwow) | Accelerating Additive (2% bwoc) | Zero Gel Time (hr:min) | Transition Time at 65° F. (hr:min) |
|---|---|---|---|---|---|---|---|---|
| 1 | Class A | 18 | 63 | 1 | 0.1 | $CaCl_2$ | 2:09 | 0:16 |
| 2 | Class A | 18 | 63 | 1 | 0.1 | $FeCl_2$ | 2:13 | 0:05 |
| 3 | Class A | 18 | 63 | 1 | 0.1 | $FeCl_3$ | 2:16 | 0:08 |

[1]Micro Matrix ® cement from Halliburton Energy Services, Duncan, Oklahoma.
[2]ZoneSeal 2000 ™ foam additive from Halliburton Energy Services, Duncan, Oklahoma.
[3]Ez-Flo ™ flow additive from Halliburton Energy Services, Duncan, Oklahoma.

From the results set forth in Tables I and II, it can be seen that the cement compositions of this invention, which contain iron salts, have reduced transition times and improved compressive strength thereby making them very desirable for use in preventing fluid influx in a well bore penetrating a subterranean formation.

The foregoing descriptions of specific compositions and methods of the present invention have been presented for purposes of illustration and description. They are not intended to be exhaustive or to limit the invention to the precise compositions and methods disclosed and obviously many modifications and variations are possible in light of the above teaching. The embodiments were chosen and described in order to best explain the principles of the invention and its practical application, to thereby enable others skilled in the art to best utilize the invention with various modifications as are suited to the particular use contemplated. It is intended that the scope of the invention be defined by the claims appended hereto and their equivalents.

What is claimed is:

1. A method of cementing in a subterranean zone having a temperature of about 65° F. or less using a lightweight well cement composition comprising the steps of:
   preparing a pumpable lightweight cement slurry having a density of less than about 14 lbs/gal;
   reducing the transition time of the lightweight cement slurry by including an effective amount of an iron compound in the composition to reduce the transition time thereof;
   placing the slurry in the subterranean zone to be cemented wherein said zone has a temperature of about 65° F. or less; and
   allowing the slurry to set into a hard impermeable mass.

2. The method of claim 1 wherein the slurry has a transition time of less than about 15 minutes.

3. The method of claim 1 wherein said iron compound is present in an amount in the range of from about 0.1 to about 10 percent by weight of said composition.

4. The method of claim 1 wherein said iron compound is an iron salt selected from the group consisting of ferric chloride, ferrous chloride and mixtures thereof.

5. The method of claim 1 wherein said iron compound is an iron salt selected from the group consisting of ferric chloride, ferrous chloride and mixtures thereof present in an amount in the range of from about 0.1 to about 10 percent by weight of said composition.

6. The method of claim 1 wherein the composition comprises a lightweight cement additive or is foamed.

7. The method of claim 1 wherein the composition comprises:
   Portland cement;
   ferric chloride, ferrous chloride or mixtures thereof present in an amount in the range of from about 0.1 to about 10 percent by weight of said composition;
   sufficient water selected from the group consisting of fresh water, unsaturated salt solutions and saturated salt solutions to form a pumpable slurry;
   an effective amount of a foaming additive for preparing a foamed slurry; and
   sufficient gas to foam the slurry.

8. The method of claim 7 wherein said foaming additive is a single additive for foaming and stabilizing the slurry is comprised of an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10 and the surfactant is present in the additive in an amount in the range of from about 60 to about 64 parts by weight, an alkyl or alkene amidopropyl betaine surfactant having the formula $$R-CONHCH_2CH_2CH_2N^+(CH_3)_2CH_2CO_2^-$$

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula $$R-CONHCH_2CH_2CH_2N^+(CH_3)_2O^-$$

wherein R is a radical selected from the group of decyl, cocoyl, lauryl, cetyl and oleyl and the surfactant is present in the additive in an amount in the range of from about 3 to about 10 parts by weight.

9. The method of claim 1 wherein the composition comprises a particulate flow enhancing additive comprising a particulate solid material carrying a flow inducing chemical selected from the group consisting of polar molecule producing acids, their salts and acid anhydrides wherein said particulate solid material and said flow inducing chemical are present in the range of from about 90:10 to about 10:90.

10. The method of claim 1 wherein the composition comprises a fine particle size cementitious material having a Blaine Fineness of no less than about 6000 $cm^2$/gm and a particle size no greater than about 30 microns present in an amount of from about 1 to about 30 percent by weight of said Portland cement.

11. A method of reducing the transition time of a foamed well cement composition placed in a subterranean zone having a temperature of about 65° F. or less comprising the steps of:
   preparing a foamed well cement composition comprising a hydraulic cement, sufficient water to form a pumpable slurry, an effective amount of a foaming additive for producing a foamed slurry, and sufficient gas to produce the foamed slurry;

reducing the transition time of the foamed slurry by including an effective amount of an iron compound in the composition to reduce the transition time thereof;

placing the slurry in the subterranean zone to be cemented wherein said zone has a temperature of about 65° F. or less; and allowing the slurry to set into a hard impermeable mass.

12. The method of claim 11 wherein the slurry has a transition time of less than about 15 minutes.

13. The method of claim 11 wherein said iron compound is present in an amount in the range of from about 0.1 to about 10 percent by weight of said composition.

14. The method of claim 11 wherein said iron compound is an iron salt selected from the group consisting of ferric chloride, ferrous chloride and mixtures thereof.

15. The method of claim 11 wherein said iron compound is an iron salt selected from the group consisting of ferric chloride, ferrous chloride and mixtures thereof present in an amount in the range of from about 0.1 to about 10 percent by weight of said composition.

16. The method of claim 11 wherein the foamed cement composition comprises:

Portland cement;

ferric chloride, ferrous chloride or mixtures thereof present in an amount in the range of from about 0.1 to about 10 percent by weight of said composition; and water selected from the group consisting of fresh water, unsaturated salt solutions and saturated salt solutions.

17. The method of claim 16 wherein said foaming additive is a single additive for foaming and stabilizing the slurry comprised of an ethoxylated alcohol ether sulfate surfactant of the formula

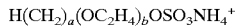

$$H(CH_2)_a(OC_2H_4)_bOSO_3NH_4^+$$

wherein a is an integer in the range of from about 6 to about 10 and b is an integer in the range of from about 3 to about 10 and the surfactant is present in the additive in an amount in the range of from about 60 to about 64 parts by weight, an alkyl or alkene amidopropyl betaine surfactant having the formula

$$R-CONHCH_2CH_2CH_2N^+(CH_3)_2CH_2CO_2^-$$

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula

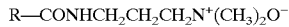

$$R-CONHCH_2CH_2CH_2N^+(CH_3)_2O^-$$

wherein R is a radical selected from the group of decyl, cocoyl, lauryl, cetyl and oleyl and the surfactant is present in the additive in an amount in the range of from about 3 to about 10 parts by weight.

18. The method of claim 11 wherein the foamed cement composition comprises a particulate flow enhancing additive comprising a particulate solid material carrying a flow inducing chemical selected from the group consisting of polar molecule producing acids, their salts and acid anhydrides wherein said particulate solid material and said flow inducing chemical are present in the range of from about 90:10 to about 10:90.

19. The method of claim 11 wherein the foamed cement composition comprises a fine particle size cementitious material having a Blaine Fineness of no less than about 6000 cm²/gm and a particle size no greater than about 30 microns present in an amount of from about 1 to about 30 percent by weight of said Portland cement.

20. A method of reducing the transition time of a foamed cement composition placed in a subterranean zone having a temperature of about 65° F. or less comprising the steps of:

preparing a foamed well cement composition comprising hydraulic cement, sufficient water to form a pumpable slurry, an effective amount of a foaming additive for producing a foamed slurry, and sufficient gas to produce the foamed slurry;

wherein said foaming additive comprises a single additive for foaming and stabilizing the slurry comprised of an ethoxylated alcohol ether sulfate surfactant of the formula

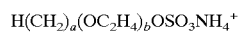

$$H(CH_2)_a(OC_2H_4)_bOSO_3NH_4^+$$

wherein a is an integer in the range of from about 6 to about 10 and b is an integer in the range of from about 3 to about 10 and the surfactant is present in the additive in an amount in the range of from about 60 to about 64 parts by weight, an alkyl or alkene amidopropyl betaine surfactant having the formula

$$R-CONHCH_2CH_2CH_2N^+(CH_3)_2CH_2CO_2^-$$

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula

$$R-CONHCH_2CH_2CH_2N^+(CH_3)_2O^-$$

wherein R is a radical selected from the group of decyl, cocoyl, lauryl, cetyl and oleyl and the surfactant is present in the additive in an amount in the range of from about 3 to about 10 parts by weight;

reducing the transition time of the foamed slurry by including an effective amount of an iron compound in the composition to reduce the transition time thereof;

placing the slurry in the subterranean zone to be cemented wherein said zone has a temperature of about 65° F. or less; and allowing the slurry to set into a hard impermeable mass.

21. The method of claim 20 wherein said iron compound is present in an amount in the range of from about 0.1 to about 10 percent by weight of said composition.

22. The method of claim 20 wherein said iron compound is an iron salt selected from the group consisting of ferric chloride, ferrous chloride and mixtures thereof.

23. The method of claim 20 wherein said iron compound is an iron salt selected from the group consisting of ferric chloride, ferrous chloride and mixtures thereof present in an amount in the range of from about 0.1 to about 10 percent by weight of said composition.

24. The method of claim 20 wherein the foamed well cement composition comprises a particulate flow enhancing additive comprising a particulate solid material carrying a flow inducing chemical selected from the group consisting of polar molecule producing acids, their salts and acid anhydrides wherein said particulate solid material and said flow inducing chemical are present in the range of from about 90:10 to about 10:90.

25. The method of claim 20 wherein the foamed well cement composition comprises a fine particle size cementitious material having a Blaine Fineness of no less than about 6000 cm$^2$/gm and a particle size no greater than about 30 microns present in an amount of from about 1 to about 30 percent by weight of said Portland cement.

26. A method for cementing a conductor pipe in a well bore having a temperature of about 65° F. or less in a seafloor in a water depth over 1000 feet comprising the steps of:

preparing a foamed well cement composition comprising:
Portland cement;
an iron salt selected from the group consisting of ferric chloride, ferrous chloride and mixtures thereof present in an amount in the range of from about 0.1 to about 10 percent by weight of said composition;
sufficient water selected from the group consisting of fresh water, unsaturated salt solutions and saturated salt solutions to form a pumpable slurry;
an effective amount of a foaming additive for producing a foamed slurry; and
sufficient gas to produce the foamed slurry;
introducing the slurry into the conductor pipe whereby it is caused to flow through the pipe and return from the lower end thereof through an annulus present between the pipe and the well bore to the surface of the seafloor wherein the annulus has a temperature of about 65° F. or less; and
maintaining the slurry in the annulus for a sufficient time to enable the slurry to form a rigid cement sheath whereby influx of fluids into the well bore is prevented.

27. The method of claim 26 wherein the slurry has a transition time of less than about 15 minutes at the temperature of the sea floor.

28. The method of claim 26 wherein said foaming additive is a single additive for foaming and stabilizing the slurry comprised of an ethoxylated alcohol ether sulfate surfactant of the formula

wherein a is an integer in the range of from about 6 to about 10 and 6 is an integer in the range of from about 3 to about 10 and the surfactant is present in the additive in an amount in the range of from about 60 to about 64 parts by weight, an alkyl or alkene amidopropyl betaine surfactant having the formula

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula

wherein R is a radical selected from the group of decyl, cocoyl, lauryl, cetyl and oleyl and the surfactant is present in the additive in an amount in the range of from about 3 to about 10 parts by weight.

29. The method of claim 26 wherein the foamed well cement composition comprises a particulate flow enhancing additive comprising a particulate solid material carrying a flow inducing chemical selected from the group consisting of polar molecule producing acids, their salts and acid anhydrides wherein said particulate solid material and said flow inducing chemical are present in the range of from about 90:10 to about 10:90.

30. The method of claim 26 wherein the foamed well cement composition comprises a fine particle size cementitious material having a Blaine Fineness of no less than about 6000 cm$^2$/gm and a particle size no greater than about 30 microns present in an amount of from about 1 to about 30 percent by weight of said Portland cement.

31. A method of cementing in a subterranean zone having a temperature of about 65° F. or less comprising the steps of:

preparing a cement composition comprising hydraulic cement, an iron compound present in an amount sufficient to reduce the transition time of the cement composition, and sufficient water to form a pumpable slurry;
placing the slurry in the subterranean zone having a temperature of about 65° F. or less; and
allowing the slurry to set into a hard impermeable mass.

32. The method of claim 31 wherein said hydraulic cement is Portland.

33. The method of claim 31 wherein said iron compound is selected from the group consisting of ferric chloride, ferrous chloride or mixtures thereof.

34. The method of claim 31 wherein said iron compound is present in an amount in the range of from about 0.1 to about 10 percent by weight of said cement composition.

35. The method of claim 31 wherein said water is selected from the group consisting of fresh water, unsaturated salt solutions and saturated salt solutions.

36. The method of claim 31 wherein said cement composition further comprises a particulate flow enhancing additive comprising a particulate solid material carrying a flow inducing chemical selected from the group consisting of polar molecule producing acids, their salts and acid anhydrides wherein said particulate solid material and said flow inducing chemical are present in the range of from about 90:10 to about 10:90.

37. The method of claim 31 wherein said cement composition further comprises a fine particle size cementitious material having a Blaine Fineness of no less than about 6000 cm$^2$/gm and a particle size no greater than about 30 microns present in an amount of from about 1 to about 30 percent by weight of said hydraulic cement.

* * * * *